Figure 1:
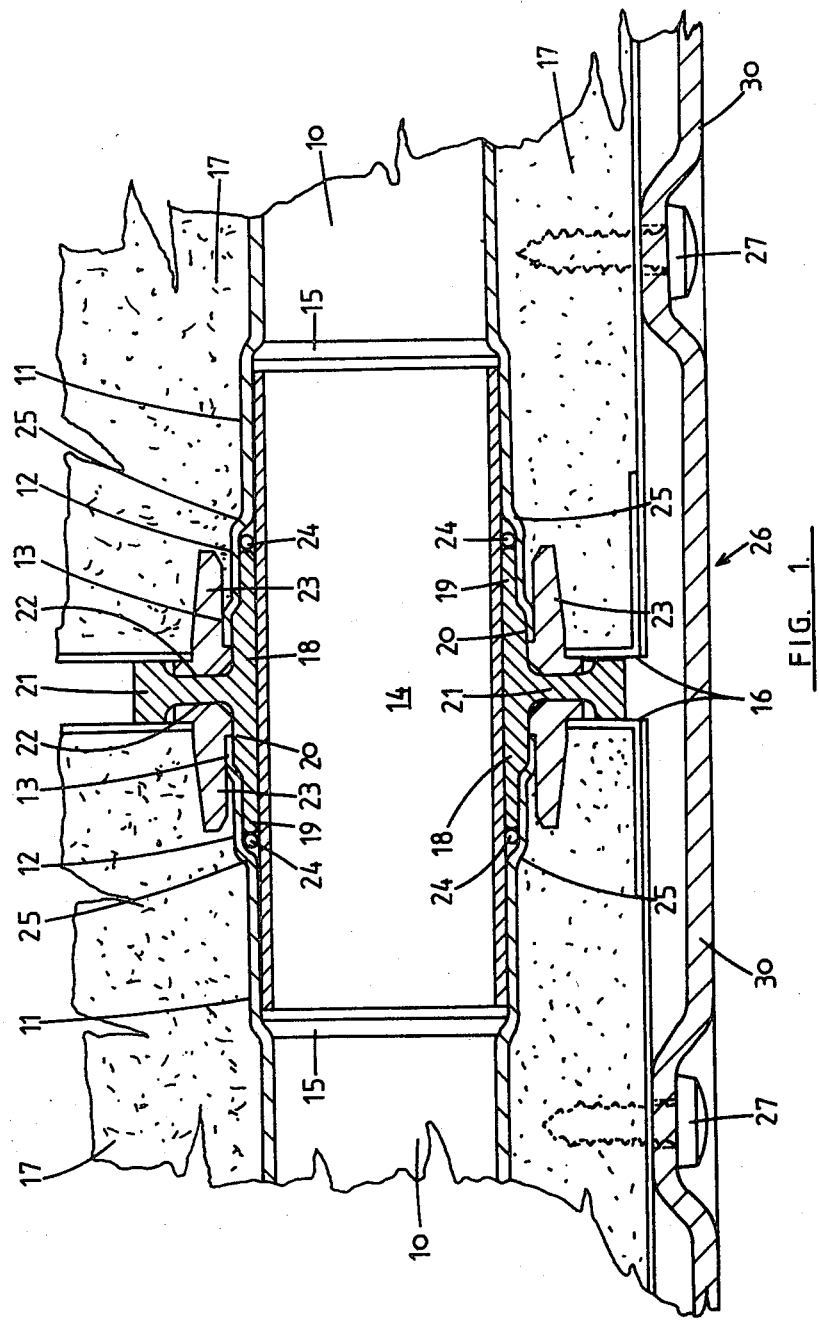

United States Patent [19]

Kibblewhite

[11] 4,281,643
[45] Aug. 4, 1981

[54] PIPE COUPLINGS

[76] Inventor: Kenneth H. Kibblewhite, 33 Folkstone Dr., Flaxmere, New Zealand

[21] Appl. No.: 965,199
[22] Filed: Nov. 30, 1978
[51] Int. Cl.³ .......................... F24J 3/02; F16L 21/06
[52] U.S. Cl. ..................................... 126/450; 138/89; 285/371
[58] Field of Search ................ 126/450; 285/370, 371, 285/397, 398, 331, 332.5, 417, DIG. 19, DIG. 22, 422; 138/89

[56] References Cited

U.S. PATENT DOCUMENTS

| | | | |
|---|---|---|---|
| 779,750 | 1/1905 | Vogel | 285/370 |
| 1,934,022 | 11/1933 | Wiggins | 285/398 |
| 2,153,330 | 4/1939 | Kludt | 138/89 |
| 3,853,338 | 12/1974 | Wilson | 285/DIG. 22 |
| 3,965,887 | 6/1976 | Gramer | 126/450 |
| 4,138,989 | 2/1979 | Doyle | 126/450 |
| 4,154,223 | 5/1979 | Löf | 126/450 |
| 4,170,507 | 10/1979 | Keeling | 126/450 |

FOREIGN PATENT DOCUMENTS

| | | | |
|---|---|---|---|
| 684638 | 3/1965 | Italy | 285/397 |
| 510617 | 6/1976 | U.S.S.R. | 285/370 |

Primary Examiner—Herbert F. Ross
Attorney, Agent, or Firm—Gottlieb, Rackman & Reisman

[57] ABSTRACT

A coupling for the outwardly stepped end of a pipe. The coupling comprises a body having first and second stepped portions which when the body is inserted axially into the pipe end engages with corresponding stepped portions. The body includes a flange which engages with the pipe end and securing means are provided fo retaining the body in position in the pipe. The coupling can be used for coupling pipes which are each located in housings. The housings can be for example those of solar energy absorber panels with the coupling joining together the header pipes.

13 Claims, 5 Drawing Figures

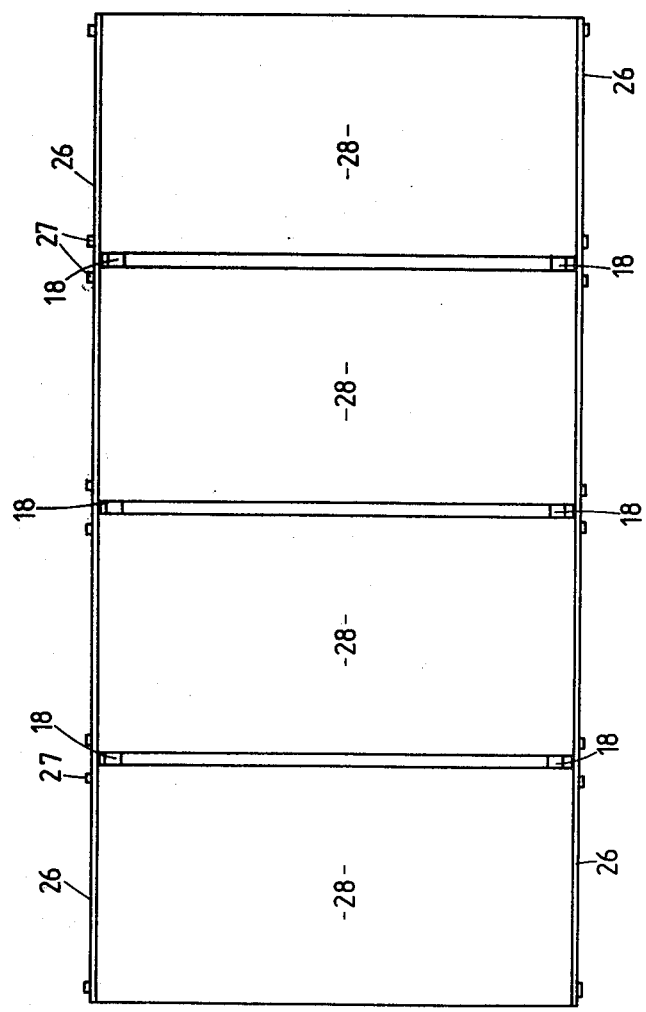

U.S. Patent  Aug. 4, 1981  Sheet 3 of 3  4,281,643

PIPE COUPLINGS

This invention relates to a coupling and more especially to a coupling for use with the inlet and outlet or header pipes of solar energy absorber panels.

It is often necessary to connect together a number of solar energy absorber panels (hereinafter referred to as absorbers or absorber panels) to form a bank of absorbers so as to satisfy different energy demands. The number of absorber panels required to form a bank normally varies between two and six units. As these absorbers are used to heat water the interconnections between the absorber panels invariably involves a plumbing operating such as brazing the interconnecting pipes together, the use of screwed pipe fittings, the use of flexible pipe connections employing clips or bands or a separate header tube system.

These types of connections essentially require a length of pipe protruding from the individual absorbers and thus a wide gap between adjacent absorbers usually exists which can lead to a bank of absorbers having a somewhat unsightly appearance. Once the bank has been assembled it is necessary to insulate the connections so as to reduce heat loss from the hot water which circulates through the connections. Equipment and tools have to be employed to install the connections and hence the design of the connection joint must allow for sufficient space around the vicinity thereof in order to use the tools employed for the installation.

In addition, the protruding pipes create difficulties when packing the absorbers so as to prevent damage to the pipes during transit.

Other problems can arise. For example, with brazed connections the connecting pipes normally have to be sawn or otherwise severed for maintenance or removal of the absorber panel(s). As a further example of problems arising with known connections the flexible pipe type of connection generally cannot withstand mains water pressure and/or the temperature of the solar heated water which circulates through the absorbers.

The present invention is therefore concerned with a coupling for use with the header or inlet and outlet pipes of solar energy absorber panels which employs a push fit joint to overcome or go some way to overcoming the above mentioned disadvantages. Whilst the invention has particular application to the coupling of header or inlet and outlet pipes of absorber panels it will be appreciated that the coupling may have other applications where pipes in adjacent housings need to be coupled.

Broadly in one aspect the invention relates to a coupling between pipes which have outwardly stepped ends and are each located in housings, said coupling comprising a tubular member extending axially between said pipes and located by each end in a stepped portion of each respective pipe, a sleeve located over said tubular member and extending axially between said pipes, said sleeve having the ends thereof engaged in respective pipes between said tubular member and the or a further stepped portion of said pipes, and fixing means for retaining the pipe housings in a spaced relationship.

According to a second aspect the invention consists of at least two solar energy absorber panels the adjacent ends of the header or inlet and outlet pipes thereof being coupled by a coupling of the type according to the foregoing aspect.

Figure 4:
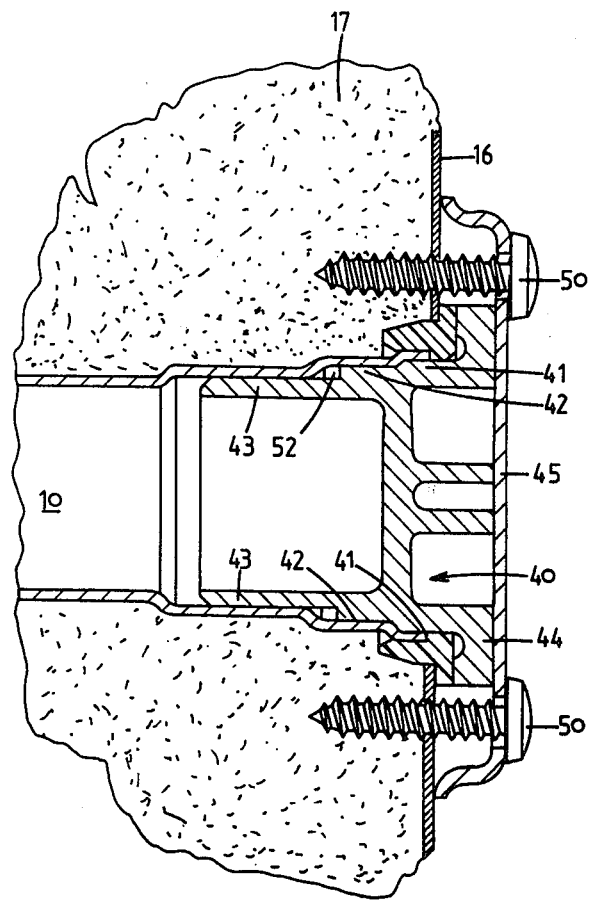
Figure 3:
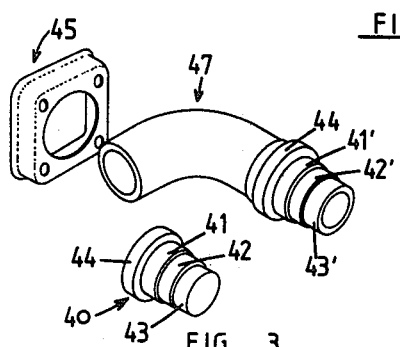
Figure 5:
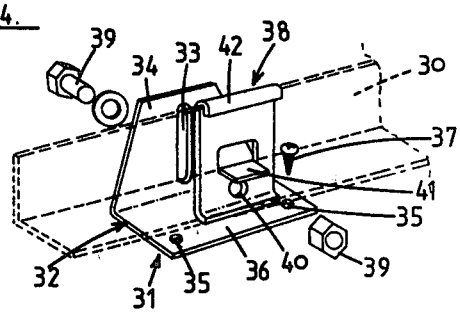

In more fully describing the invention in its preferred form reference will be made to the accompanying drawings in which:

FIG. 1 is a cross section of the coupling between pipes in two adjacent housings, FIG. 2 is an overall view of a bank of absorber panels coupled together by couplings according to the present invention, FIG. 3 is a perspective view of fittings for use with absorber panels coupled by the coupling of the present invention, FIG. 4 is a cross section of a blanking plug inserted into the header pipe of an absorber panel and FIG. 5 is an exploded perspective view of a clamp and rail employed for mounting of absorber panels coupled by the coupling of the present invention.

The coupling consists of a number of components which are installed by a push-fit operation. As shown in FIG. 1 the ends of the respective pipes 10 are outwardly swaged to form three stepped portions 11, 12 and 13 respectively. These stepped portions are of increasing diameter towards the open end of the pipe and the function of the first step 11 is to locate a tubular member 14 and thus axially align the pipes 10. It will be appreciated from FIG. 1 that the length of tubular member 14 is less than the distance between the inclined face 15 of each pipe. Accordingly, the tubular member 14 is free to move axially and hence is unaffected by varying rates of expansion due to changing water temperatures.

As referred to in the preamble, the present invention is mainly designed for coupling adjacent absorber panels and the present description will relate to the coupling when used in this application. As shown in FIG. 1 the absorbers have a housing 16 which is filled with an isulation material, shown generally at 17, which surrounds the pipe 10. This pipe 10 can be a header pipe or a length of pipe which forms the inlet or outlet of an absorber panel.

A connector sleeve 18 is located about the tubular member 14. The outer ends of this sleeve are stepped at 19 and 20 so as to inter-engage with steps 12 and 13 respectively of pipes 10. Midway in the length of the connector sleeve 18, i.e. midway in stepped portion 20 there is an upstanding flange 21 which has an annular groove 22 formed in each vertical face thereof.

The end of pipe 10 can protrude slightly beyond the outer face of housing 16 or be substantially flush. A collar 23 of substantially T shaped cross section has its stem located in an opening between the terminal edge of housing 16 and outer peripheral surface of pipe 10. The cross piece of this seal 23 covers the gap between the end of pipe 10 and terminal edge of housing 16 and as shown in FIG. 1 in the completed coupling locates in the annular groove 22 of connector sleeve 18.

Also referring to FIG. 1 it will be noted that there is an O ring 24 placed over tubular member 14 to be positioned in the area between the stepped end 19 of connector sleeve 18 and the inclined face 25 joining steps 11 and 12 of pipe 10. As the tubular member 14 is diametrically located in stepped portions 11 the O ring 24 is not so compressed radially in one direction to the extent that a leak forming gap appears on the opposite side. The O ring 24 thus relies on the diametrical clearance between the tubular member 14 and step 12 to affect a seal and not the axial location of the O ring against the inclined face 25.

The coupling is completed by a fastening 26 which extends between corresponding faces of housing 16 and is secured to each housing by screws 27. Bracket 26 is preferably formed by an L shaped rail 30 (FIG. 5) which is supported on a surface such as a corrugated iron roof by a series of clamps 31. Each clamp 31 consists of a L shaped bracket 32 which has a vertically disposed elongated slot 33 in one leg 34 and openings 35 in the other leg 36. These openings 35 are provided for the reception of fastenings 37. A clamp piece 38 is bolted to leg 34 by a nut and bolt 39 passing through slot 33 and opening 40. A ledge 41 projects from the face of clamp piece 38. The upper edge of rail 30 engages in a return 42 at the upper edge of clamp piece 38 whilst the base of the rail rests on ledge 41.

In FIG. 2 there are shown four absorber panels 28 the adjacent header pipes 10 of which are coupled by the couplings according to the present invention.

The header tube collar 23 locates the header pipe 10 with respect to the opening in the casing 16 and also acts as a seal for the insulation 17 within housing 16. Besides this, collar 23 protects the end of header pipe 10 when the collector panel 28 is in transit. The central flange 21 in sleeve 18 acts as insulation for the coupling to prevent or reduce any possible heat loss through the coupling.

Step 13 is also of assistance when assembling the coupling as it provides a lead in for O ring 24.

When pressurized water circulates through the coupling the O ring 24 seals the gap common to the second step 12 of header pipe 10, the connector sleeve 18 and tubular member 14 by means of a radial pressure on the O ring and an axial pressure against the connector sleeve 18. Separation of the coupling due to internal pressure is prevented by bracket 26 securing the adjacent housing 16.

Solar energy absorber panels are readily mountable, on say a roof, by use of the couplings and mounting rails. A first clamp 31 is mounted on a roof by fastenings 37 passing through openings 35. A sealing compound is applied around the holes formed in the roof to provide a water tight seal. By using the rail 30 for alignment purposes a second clamp 31 is positioned and then fixed to the roof. Preferably a fall of 1:100 is allowed along the rail. The remaining clamps 31 are then fixed in position.

An absorber panel is next located at each end of the rail with its bottom edge engaged in the angle of the rail. These two panels are then fixed in place by fastenings 27. The top rail 30 can now be positioned along the top edge of the panels and fixed in place. This top rail is next secured to clamp 31 and following this the clamps are themselves secured to the roof. It will be appreciated that the panels can, if required, be inclined to the plane of the roof by virtue of the elongated slots 33 allowing the position of clamp piece 38 to be adjusted along the leg 34.

The couplings can now be assembled by pushing tubular member 14 into sleeve 18 and then positioning O rings 24 on member 14. The assembled coupling is then inserted into the end of header pipe 10 of one panel 28. The other panel 28 which is already in position is then released and slid along to lie adjacent the first panel so that the couplings engaged in the ends of the header pipe 10 thereof. To ascertain whether the couplings are correctly pushed home the distance between the edges of adjacent edges 16 can measured. This panel is then secured in place by fastenings 27. The remaining panels are then positioned and fastened in the same fashion to form a bank as shown in FIG. 2.

Referring to FIG. 3 fittings are illustrated which are respectively employed to blank off the end of a header pipe or connect a header pipe to a supply or deliver pipe. The blanking off plug 40 has three stepped portions 41, 42, and 43 which correspond to the two steps formed in sleeve 18 and the projecting part of tubular member 14. Plug 40 has an end flange 44 which as shown in FIG. 4 engages with a seal 23 in the same manner as sleeve 18. Accordingly, when the end of a header pipe 10 needs to be blanked off plug 40 is provided with an O ring 52 which fits at the step between step portions 42 and 43. As shown in FIG. 4 the plug 40 is maintained in position by an end cap 45. This end cap 45 which is more particularly shown in FIG. 3 is secured over flange 44 of plug 40 by fastenings 50 passing through openings 46 and into housing 16 of the panel. A sealing collar 51 is located between flange 44 and the opening between the housing 16 and the end of pipe 10.

Where a header pipe is to be connected to a supply or delivery pipe of the solar heater system and elbow 47 is employed. This elbow 47 has one end formed with a flange 44 and stepped portions 41' 42' and 43'. As with the plug 40 the stepped end is inserted into pipe 10 and held in place by end cap 45. It will be appreciated that plug 40 and elbow 47 are both push fits into header pipes 10 in the same manner as the coupling previously described.

The coupling according to the present invention has many advantages over the conventional coupling of solar energy absorbing panels and some of these advantages can be stated as follows:

(a) The gap between absorber panels is kept to a minimum hence an aesthetically pleasing appearance is acheived.

(b) Separate insulation of the coupling is eliminated as the insulation is built into the coupling component.

(c) The ease of installation or removal of an absorber panel is achieved by the push-fit operation hence the cost of installation is reduced considerably.

(d) Any protrusion of the header or inlet and outlet pipes (which is protected) is in the order of a few millimeters and complex packaging to prevent possible damage to the header tubes is not necessary.

(e) Special tools are not required to assemble the coupling during installation except for a screwdriver to secure the brackets.

(f) The coupling is designed to withstand mains water pressure and the temperature of solar heated water.

(g) The couplings also assist in alignment of the absorber panels.

(h) Limited misalignment of absorber panels can be accounted for in the compression of the O ring.

Whilst the foregoing description has related to the coupling of header pipes or inlet and outlet in solar energy absorber panels, it should be remembered that the coupling would also have application where pipes are located within housings and the coupling between the housings and pipes must be insulated to prevent heat loss from fluid flowing through the pipes and coupling.

What is claimed is:

1. A coupling between pipes which have outwardly stepped ends and are each located in housings, said coupling comprising a tubular member extending axially between said pipes and located by each end in a stepped portion of each respective pipe, a sleeve located over said tubular member and extending axially between said pipes, said sleeve having the ends thereof engaged in respective pipes between said tubular member and the or a further stepped portion of said pipes and fixing means for retaining the pipe housings in a spaced relationship.

2. A coupling is claimed in claim 1 wherein said sleeve has an upstanding flange which extends between the respective pipe ends.

3. A coupling is claimed in claim 2 wherein an annular seal is located between each said pipe end and the upstanding flange.

4. A coupling is claimed in claim 3 wherein said flange includes a recess in which said annular seal engages.

5. A coupling is claimed in claim 4 wherein said annular seal includes a projection which extends between said housing and the outer surface of said pipe end.

6. A coupling is claimed in claim 5 wherein said annular seal is of substantially T-shape cross section.

7. A coupling is claimed in claim 3 wherein two annular sealing members are located on said tubular member and are positioned between the end of the sleeve and the transition between the said further stepped portions.

8. A coupling is claimed in claim 7 wherein each said pipe end has a third stepped portion at the extreme end thereof, this third stepped portion engaging with a stepped portion extending from the flange of said sleeve.

9. A coupling is claimed in claim 1 wherein the fixing means is at least one bridge member secured to the pipe housings by mechanical fastenings.

10. A solar heater which includes at least two solar energy absorber panels mounted side by side with the adjacent end of the header or inlet and outlet pipes thereof coupled by a coupling of the type set forth in claim 1.

11. A solar heater is claimed in claim 10 wherein said panels are mounted by mounting rails which also form the fixing means to retain the pipe ends in said spaced relationship.

12. A solar heater is claimed in claim 11 wherein said rails are mounted by a series of clamps each said clamp comprising a first member adapted for securing to a fixture and a second member having retaining means which engage with said rail, the second member being so mounted on said first member that its position thereon can be adjusted.

13. A solar heater is claimed in claim 12 wherein the second member includes a groove and spaced there from a ledge, said rail being of L shape cross-section with the edge of one leg engaged in said groove and the other leg engaged on said ledge.

* * * * *